UNITED STATES PATENT OFFICE.

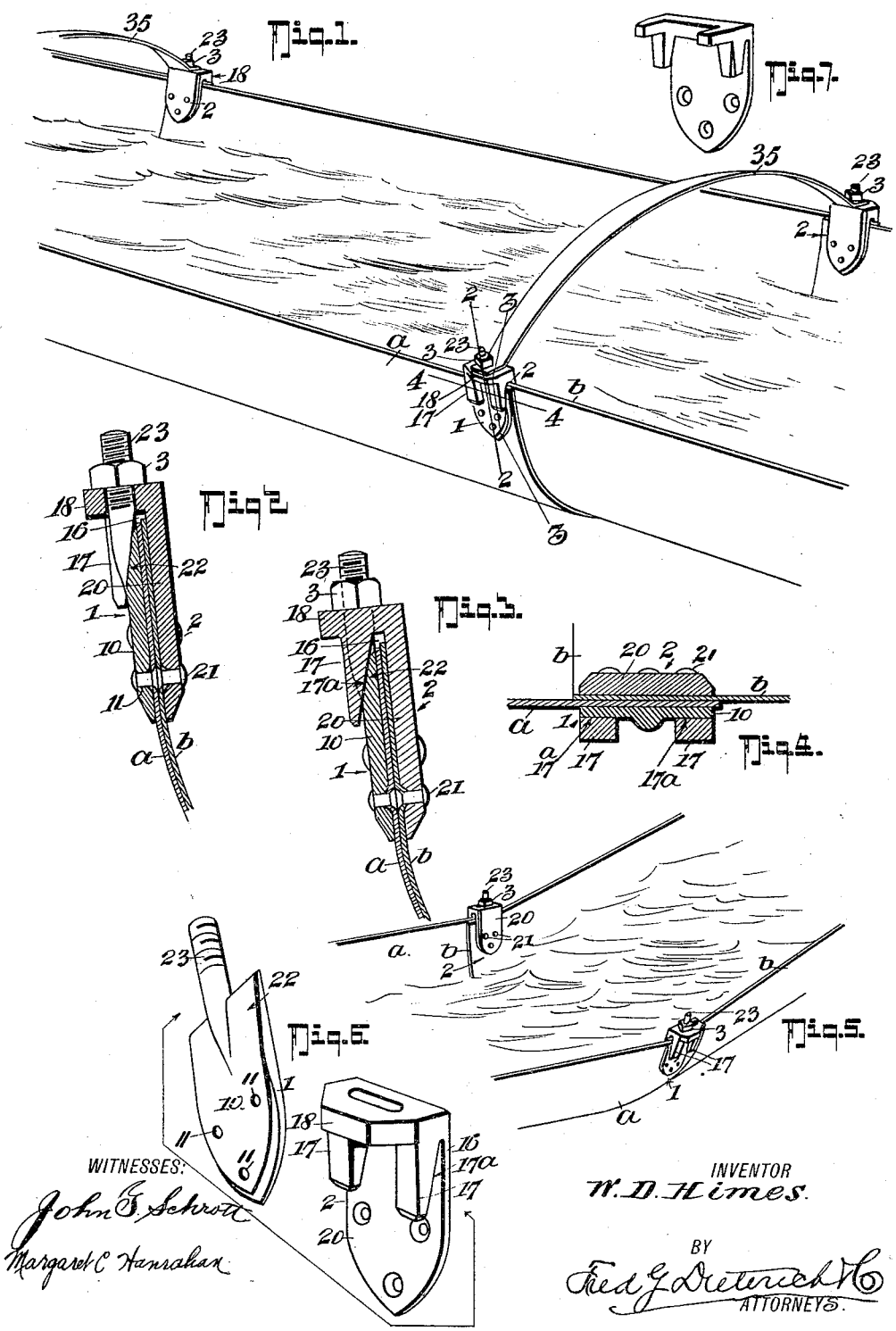

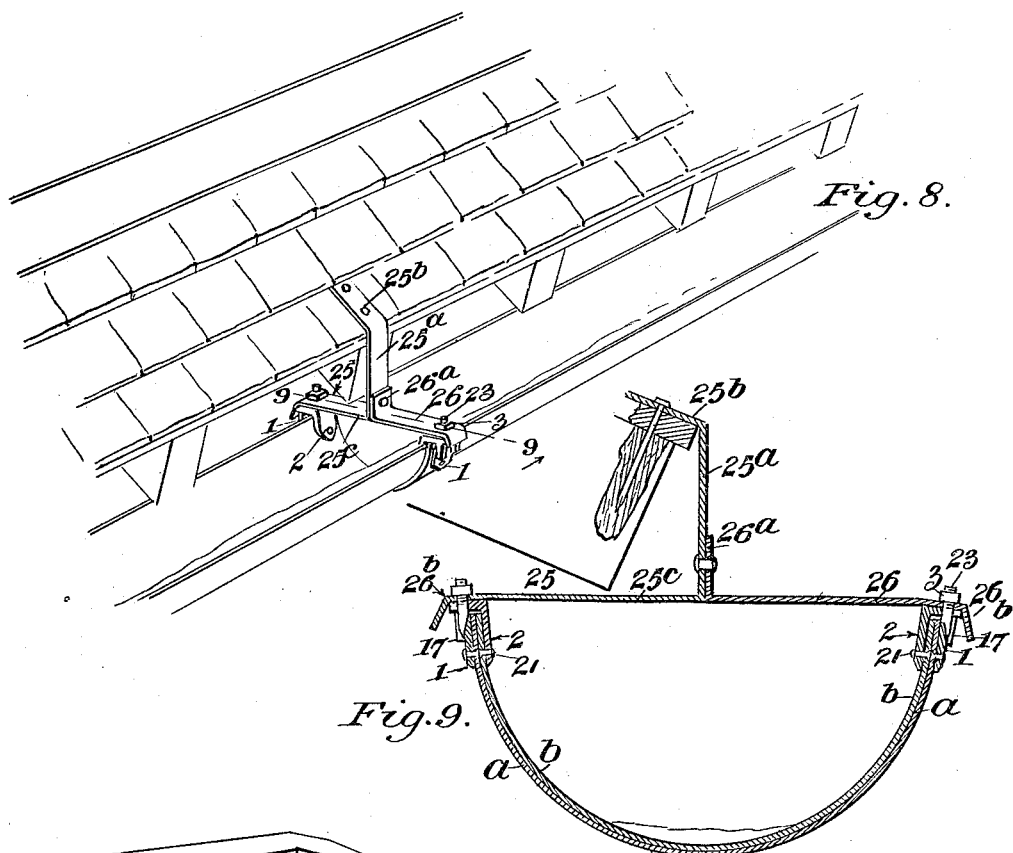
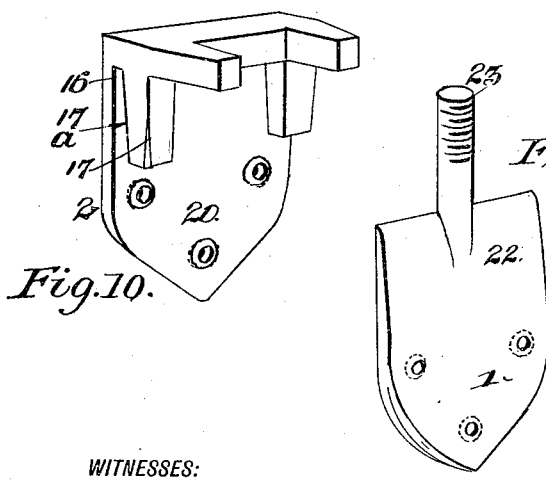

WRIGHTSMAN D. HIMES, OF DELTA, COLORADO.

FLUME-JOINT COUPLING.

1,138,657.   Specification of Letters Patent.   Patented May 11, 1915.

Application filed August 14, 1914. Serial No. 856,784.

*To all whom it may concern:*

Be it known that I, WRIGHTSMAN D. HIMES, residing at Delta, in the county of Delta and State of Colorado, have invented a new and Improved Flume-Joint Coupling, of which the following is a specification.

My invention is in the nature of an improved coupling device for joining the lapped ends of sheet metal sections of flume troughs and other like conveyers and it primarily has for its object to provide a coupling device of the character stated of a simple and inexpensive construction, adapted for being readily applied for use and which effectively serves to produce a water-tight union of the said lapped ends of the flume sections.

Another object of my invention is to provide a coupling device of the character stated having the parts thereof so designed and coöperatively arranged whereby they may be quickly adjusted for joining the flume section ends or curves and also to allow for expansion and contraction of the joint without impairing the water tight connection.

With the above and other objects in view, my invention embodies the peculiar construction and novel combination of parts all of which will be hereinafter fully explained, specifically pointed out in the appended claims and illustrated in the accompanying drawing, in which:

Figure 1 is a perspective view of my flume joint coupling, the same being shown as applied for use. Fig. 2 is a vertical section thereof on the line 2—2 on Fig. 1. Fig. 3 is a similar view on the line 3—3 of Fig. 1. Fig. 4 is a horizontal section thereof on the line 4—4 on Fig. 1. Fig. 5 is a perspective view that shows the parts that constitute my coupling device adjusted for joining the ends of the flume sections on a curve. Fig. 6 illustrates in perspective, the several parts of my coupling device separated. Fig. 7 is a detail perspective of a slightly modified form of one of the flume sheet clamps. Fig. 8 is a perspective showing the invention applied to an eaves trough. Fig. 9 is a section on the line 9—9 on Fig. 8. Figs. 10 and 11 are perspective views of the co-acting parts of the trough clamp.

In the practical arrangement, my flume joint coupling embodies essentially but two parts, an outer clamping member 1, and an inner clamping member 2, and the said two members 1 and 2 are adapted for being connected to opposing lapped ends $a$—$b$ of flume sections.

Member 1, which is adapted for being secured upon the outside of the flume section $a$, comprises a body portion 10, provided with a number of countersunk rivet holes 11, the countersinks of which are in the face of the body 10 upon which the end of the flume section $a$ is made fast, and to leave that face of the section $a$ that engages the section $b$ smooth, the rivets and the adjacent metal of the section $a$, are hammered to sink into the countersunk holes, as is clearly shown in Fig. 2, by reference to which it will also be seen that the body portion 20 of the clamping member, which is secured upon the inside of the section $b$, is likewise fastened by rivets 21 to the section $b$ and its face that closes against the section $a$, is likewise made smooth, by hammering the rivets. Rivets or balls may be used, as desired.

Member 1 includes an upwardly projecting threaded stem 23 and the upper end of the body portion 10 is tapered on the outer face to form a wedge-like penetrating end for entering the wedge shaped recesses 16 on the member 2, formed between the guide members 17, pendent from the bracket 18 that forms a part of and projects laterally from the body 20.

To provide for a positive water-tight joint between the sections $a$—$b$, when the members 1 and 2 are drawn together, which is done by screwing home the nut 3 on the stem 23, the upper edge of the member is tapered as at 22 for engaging the tapered inner faces $17^a$ of the guide members 17. The slot in the bracket portion of the member 2 is elongated in the longitudinal direction of the flume to allow for the usual expansion and contraction of the joint without impairing the water-tight closure of such sections, and further by having the said slot elongated as shown and described, the two clamping members 1—2 can be secured upon their respective flume sections at such angles, relatively to each other as the condition of the curve may require when the union of the flume section ends are made on curves.

By reason of passing the threaded stem of the member 2 through an elongated slot in the bracket end of member 1, the flume may be of circular shape and its section ends positively joined water-tight by my coupling device.

From the foregoing taken in connection with the drawing, the complete construction, the manner of its use and the advantages of my invention will be readily understood.

Since the opposing clamping members 1 and 2, in practice, are attached to their respective flume sections as they are made up and further since one of the said members attaches to the outside of one flume section and the other member is secured to the inside of the other flume section, it follows that the coupling device does not interfere with the compact nesting of the trough sections and their safe transportation. Furthermore the construction of the two members 1 and 2 is such that the flume sections can be almost instantly joined without the use of any special tools or implements since it is only necessary to slip the threaded stems of the members 1 through the slots in the members 2, the elongation of the slots facilitating such connection, and thereby simply screw up the nuts 3 to draw the two sections $a$—$b$ into a fluid-tight connection, it being understood that should any of the joints loosen up and leak, they can be readily closed again by tightening up the nuts 3.

While I have shown and described the members 1 and 2 as having wedge-shaped connections, I desire it understood that the said wedge-shaped connections are not absolutely necessary when using my coupling on the small size flumes or eaves troughs.

While I have shown my invention as especially adapted for connecting the ends of flume troughs the same is also well adapted for use in connection with eaves troughs and when so employed a slightly modified arrangement of my invention is used which is shown in Figs. 8, 9, 10 and 11 of the drawings. In the said modified form of my invention, the same general arrangement of the clamping members 1 and 2 shown in Figs. 1, 2 and 3 is used. When employed for hanging eaves troughs, a cross member or yoke is combined with the opposite clamping members to provide a simple and effective means for hanging the trough and the said yoke member consists of two sheet metal portions, one of which 25 forms the hanger member since it includes a member $25^a$ pendent from a foot piece $25^b$ adapted for being nailed to the roof, as shown, and a horizontal or bridge piece $25^c$ that extends over the slotted end of the bracket member 2 to which it is made fast by the nut 3 that takes on the threaded end by the bolt portion 23—23 of the member 1. The other member 26 of the hanger has one edge secured to the slotted member 2, at the other side of the trough and it has an upturned flange $26^a$ at the inner end which abuts and is made fast to the pendent or hanger portion $25^a$.

Instead of making the clamping member 2 with an elongated slot for the passage of the threaded end 23 of the member 1, the said member 2 may be formed as in Fig. 7 that is with a forked upper end and when such form of clamping member 2 is used, a washer plate $26^b$ is placed over the bifurcated top of the member 2 for receiving the clamping nut 3.

Under ordinary conditions the flume sections are firmly held together by simply using the clamping members 1 and 2, as shown in Fig. 5, but where the flumes are of large capacity and arranged for carrying swift running water the joints are braced by a yoke or bridge member 35 which is the equivalent of the bridge or hanger shown in Figs. 8 and 9, but when used as shown in Fig. 8, it only has the function of holding section joints from spreading or closing toward each other since it forms, as it were, a cross brace for the said flume sections.

What I claim is:

1. In a flume, a set of overlapping sections, and means for securing the overlapping sections together, said means comprising a clamp member secured to one section and a clamp member secured to the other section, said clamp members having engaging portions and means for drawing said clamp members together to bring said engaging portions into contact, the contacting faces of said engaging portions having projections for applying a sealing pressure between the contacting faces of the overlapping flume sections.

2. In a flume, the combination with the overlapping clamp sections, of a clamp for securing the same together, said clamp comprising a main body portion, means for securing said main body portion to one of the flume sections, said main body portion including an apertured projection, a second clamp member secured to the opposed flume section and having a member to project through said slotted projection, means for drawing said clamp members in a direction parallel to one another, and means for simultaneously moving said clamp members toward each other laterally to clamp the overlapping flume sections together.

3. In a flume composed of overlapping sections, a clamp for securing the overlapping sections together, said clamp comprising two members, the first of said members consisting of a body plate, means for securing said body plate to one of the flume sections, the first of said clamp members also including a portion projecting at right angles to said body plate and provided with a longitudinal slot, the other of said clamp members consisting of a body portion, means for securing said last named body portion to the second of the overlapping flume sections, said second clamp member body portion having a lug to project through said slot, a nut threaded onto said lug for drawing said lug through said slot to thereby impart a slidable movement to said body plates, and means for imparting relative motion to said body plates to bring them closer together as said nut is screwed down.

4. In a flume composed of overlapping sections, a clamp for securing the overlapping sections together, said clamp comprising two members, the first of said members consisting of a body plate, means for securing said body plate to one of the flume sections, the first of said clamp members also including a portion projecting at right angles to said body plate and provided with a longitudinal slot, the other of said clamp members consisting of a body portion, means for securing said last named body portion to the second of the overlapping flume sections, said second clamp member body portion having a lug to project through said slot, a nut threaded onto said lug for drawing said lug through said slot to thereby impart a slidable movement to said body plates, means for imparting relative motion to said body plates to bring them closer together as the nut is screwed down, said last named means comprising projections on said first mentioned clamp member for engaging said second mentioned clamp member, the contacting surfaces between said projections and said second clamp member being beveled to thereby force said first and second clamp members bodily toward each other to clamp the flume sections together, substantially as shown and described.

5. In combination with the overlapping flume sections, a clamp member secured upon the inside of one of said sections, a clamp member secured upon the outside of the other of opposing flume sections, the said clamp members having interlocking portions, and means that co-act with the said interlocking portions for bringing the clamp members and their respective flume sections together.

6. In combination with the overlapping flume sections, a clamp member secured upon the inside of one of said sections, a clamp member secured upon the outside of the other of opposing flume sections, the said clamp members having interlocking portions, means that co-act with the said interlocking portions for bringing the clamp members and their respective flume sections together, the said means including a threaded stem on one member slidable through the other member and a clamping nut on the stem that engages said other clamp member.

WRIGHTSMAN D. HIMES.

Witnesses:
OLIVER B. COOK,
MARY A. SHEPHERD.

Copies of this patent may be obtained for five cents each, by addressing the "Commissioner of Patents, Washington, D. C."